United States Patent
Sinivaara et al.

(10) Patent No.: US 6,600,924 B1
(45) Date of Patent: Jul. 29, 2003

(54) CELL HANDOVER METHOD AND CELLULAR RADIO SYSTEM

(75) Inventors: Hasse Sinivaara, Espoo (FI); Markku Rautiola, Tampere (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/646,226

(22) PCT Filed: Mar. 16, 1999

(86) PCT No.: PCT/FI99/00195

§ 371 (c)(1),
(2), (4) Date: Sep. 14, 2000

(87) PCT Pub. No.: WO99/48320

PCT Pub. Date: Sep. 23, 1999

(30) Foreign Application Priority Data

Mar. 17, 1998 (FI) .................................................. 980584

(51) Int. Cl.⁷ ................................................. H04Q 7/20
(52) U.S. Cl. ...................... 455/444; 455/436; 455/449; 455/440; 455/442; 370/331; 370/332
(58) Field of Search ................................ 455/436, 444, 455/449, 440, 442; 370/331, 332

(56) References Cited

U.S. PATENT DOCUMENTS

| | | | |
|---|---|---|---|
| 5,509,051 A | | 4/1996 | Barnett et al. |
| 5,920,818 A | * | 7/1999 | Frodigh et al. |
| 6,094,581 A | * | 7/2000 | Fried et al. |
| 6,175,735 B1 | * | 1/2001 | Meyer |

FOREIGN PATENT DOCUMENTS

| | | |
|---|---|---|
| FI | 943935 | 2/1995 |
| FI | 102024 | 8/1997 |
| FI | 963191 | 2/1998 |
| GB | 2 294 181 | 4/1996 |
| WO | WO 96/27996 | 9/1996 |
| WO | WO 96/31078 | 10/1996 |
| WO | WO 96/34500 | 10/1996 |
| WO | WO 97/29607 | 8/1997 |
| WO | WO 97/32445 | 9/1997 |
| WO | WO 98/07289 | 2/1998 |
| WO | WO 98/25431 | 6/1998 |

* cited by examiner

*Primary Examiner*—Thanh Cong Le
*Assistant Examiner*—Huy D Nguyen
(74) *Attorney, Agent, or Firm*—Pillsbury Winthrop LLP

(57) ABSTRACT

A cell handover method and cellular radio system includes at least one indoor subscriber terminal (100) and cells (31 to 38) with operating area of each being confined to the interior of a building, and at least one outdoor cell (11) whose operating area extends from the exterior to the interior of the building, and in which cellular radio system the cell serving the subscriber terminal (100) will be changed, characterized in that the radio system is configured for cell handover in such a way that cells (31 to 38) are grouped into cell groups with a gateway cell (21 to 24) provided around each group, and with one gateway cell (21) provided at the entrance of the building, the gateway cell (21 to 24) surrounding the cell (31 to 38) is entered on the neighbor list of each cell (31 to 38), other gateway cells (22 to 24) and an outdoor cell (11) are entered on the neighbor list of the gateway cell (21) provided at the entrance, and the gateway cells (21 to 24) are entered on the neighbor list of the outdoor cell (11).

19 Claims, 4 Drawing Sheets

CELL HANDOVER METHOD AND CELLULAR RADIO SYSTEM

This application is the national phase of international application PCT/FI99/00195 filed Mar. 16, 1999 which designated the U.S.

FIELD OF THE INVENTION

The invention relates to a cell handover method employed in a cellular radio system comprising at least one indoor subscriber terminal and cells with operating area of each being confined to the interior of a building, and at least one outdoor cell whose operating area extends from the exterior to the interior of the building, and in which cellular radio system the cell serving the subscriber terminal will be changed.

BACKGROUND OF THE INVENTION

In cellular radio systems, the cell size may vary, for instance, depending on the number of subscriber terminals within the cell area. For instance, in an urban environment, where subscriber terminals are typically densely located in a relatively small area, so-called macro cells, micro cells and pico cells are employed which provide the necessary radio coverage over every serviceable area. The radius of the micro cell coverage area may range from 0.5 to 3 km, for instance. The radius of the pico cell coverage area may range from a few metres to a few tens of metres. For instance, from the view-point of network construction, an office environment can well be compared with the urban environment.

In cellular radio systems, the network monitors at all times the location of the subscriber terminal in the network. In order that monitoring would be possible, it is naturally necessary that the subscriber terminal is turned on. The network is typically divided into traffic areas, and some network element, for instance a base station controller, keeps a record of the subscriber terminal movements in different traffic areas. When the subscriber terminal is turned on, it registers to a network base station which transmits a signalling message on the basis of the registration to the base station controller. Thus the base station controller can switch an incoming call or message to a specific subscriber terminal irrespective of its location. If the subscriber terminal moves to the borders of the base station service area or outside the service area, the subscriber terminal has to reregister. If the subscriber terminal moves from one base station service area to another, a base station handover is performed. In the above-described situation, a channel and a cell are generally handed over.

In a small-cell area, there are areas and spots between cells where reception of the base station is poor. If the subscriber terminal is located in areas of that kind, problems may arise in call setup. Poor reception may cause interruption of an established connection, for instance. Problems caused by poor service areas are corrected by means of so-called umbrella cells. The umbrella cell is generally a high-power cell as compared with the underlying cells within its coverage area. The umbrella cell can be, for instance, a macro cell or a micro cell, whereby it provides a coverage area for a pico cell which serves as a small cell. In general, the calls are directed to the umbrella cell when all channels of the small-cell base station are busy or the subscriber is outside the small-cell coverage area.

In typical cellular radio systems used in office environments, pico cells are provided in predetermined locations in an office building. The cells are preferably located to cover as well as possible all spaces and floors of the building. The macro cells and micro cells surrounding the office building may, however, cause interference to data transmission inside the office building, since transmission powers used outside the office building are typically higher than those used inside. In practice this means that the subscriber terminal located inside the office building may perform a handover to a base station outside the building, and consequently the base station load of the cell outside the building may grow excessively. If the transmission power used indoors is increased in order to try to solve the problem, the overall interference in the cellular radio network increases.

When the subscriber terminal is in idle mode, it typically switches to the base station from which it receives the strongest signal. This means that the subscriber terminal which is located in a pico cell and which is in idle mode can select a cell outside the building, if the outdoor cell is also dominating inside the building.

In the cellular radio networks, specific C1 parameters are used, which determine the serving cell of the subscriber terminal, when the subscriber terminal is in idle mode. If the subscriber terminal is in dedicated mode, the cell can be forced to provide service to the subscriber terminal by means of the base station parameters. After the C1 parameter, the cellular radio networks further employ C2 parameters, by means of which the serving cell is determined to the subscriber terminal.

Currently, offices employ more and more internal information networks, so-called intranet networks, which in principle provide services that are similar to those of the internet networks. The intranet networks are implemented, for instance, by means of computers connected to a LAN network. In the future, the intranet networks operate more and more wirelessly. These wireless office systems are also called WIO systems (Wireless Intranet Office). In the new systems, it is possible for a mobile telephone, for instance, to establish a wireless connection to a transceiver located in a computer, wherefrom the connection signal passes through the LAN network to some other mobile telephone, for instance. The computer system comprising a transceiver that is able to establish a connection to a telephone is called an Intranet Mobile Cluster.

When the Intranet Mobile Cluster is installed in the office, the above-mentioned problems with radio resource management increase. In prior art systems, if the telephone that established a connection to a WIO system computer performs a cell handover to a cell outside the building, the load of the outdoor cell increases due to cell handovers. Also the telephone in idle mode inside the building loads the outdoor cell, when the telephone registers to a base station providing the cell outside the building.

BRIEF DESCRIPTION OF THE INVENTION

The object of the invention is to provide a method and equipment implementing the method so as to solve the above problems. This is achieved with a method of the type presented in the preamble characterized in that the radio system is configured for cell handover in such a way that cells are grouped into cell groups with a gateway cell provided around each group, and with one gateway cell provided at the entrance of the building, the gateway cell surrounding the cell is entered on the neighbor list of each cell, other gateway cells and an outdoor cell are entered on the neighbor list of the gateway cell provided at the entrance, and the gateway cells are entered on the neighbor list of the outdoor cell.

The invention further relates to a cellular radio system comprising at least one subscriber terminal inside the building and cells with operating area of each being confined to the interior of the building, and at least one outdoor cell whose operating area extends from the exterior to the interior of the building, and in which cellular radio system the subscriber terminal changes the serving cell if necessary.

The cellular radio network is characterized in that the radio system is configurated for cell handover in such a way that the cellular radio system comprises gateway cells, each surrounding a cell group consisting of cells, with one gateway cell provided at the entrance of the building, each cell comprising on the neighbor list the gateway cell surrounding the cell, the gateway cell at the entrance comprising other gateway cells and an outdoor cell on its neighbor list, and the outdoor cell comprises the gateway cells on its neighbor list.

The preferred embodiments of the invention are disclosed in the dependent claims.

The invention is based on determining the neighbor lists of the cells such that the cell handover from inside the building to the outdoor cell must be carried out through a specific indoor cell, even though the subscriber terminal were in the operating area of the outdoor cell while inside the building.

Several advantages are achieved with the method and system of the invention. The method can reduce the load of the outdoor cell, since cell handovers to the outdoor cell decrease. The system of the invention can be readily applied to systems currently in use.

BRIEF DESCRIPTION OF THE DRAWINGS

In the following the invention will be described in greater detail in connection with preferred embodiments, with reference to the accompanying drawings, wherein.

DETAILED DESCRIPTION OF THE INVENTION

Figure 1:
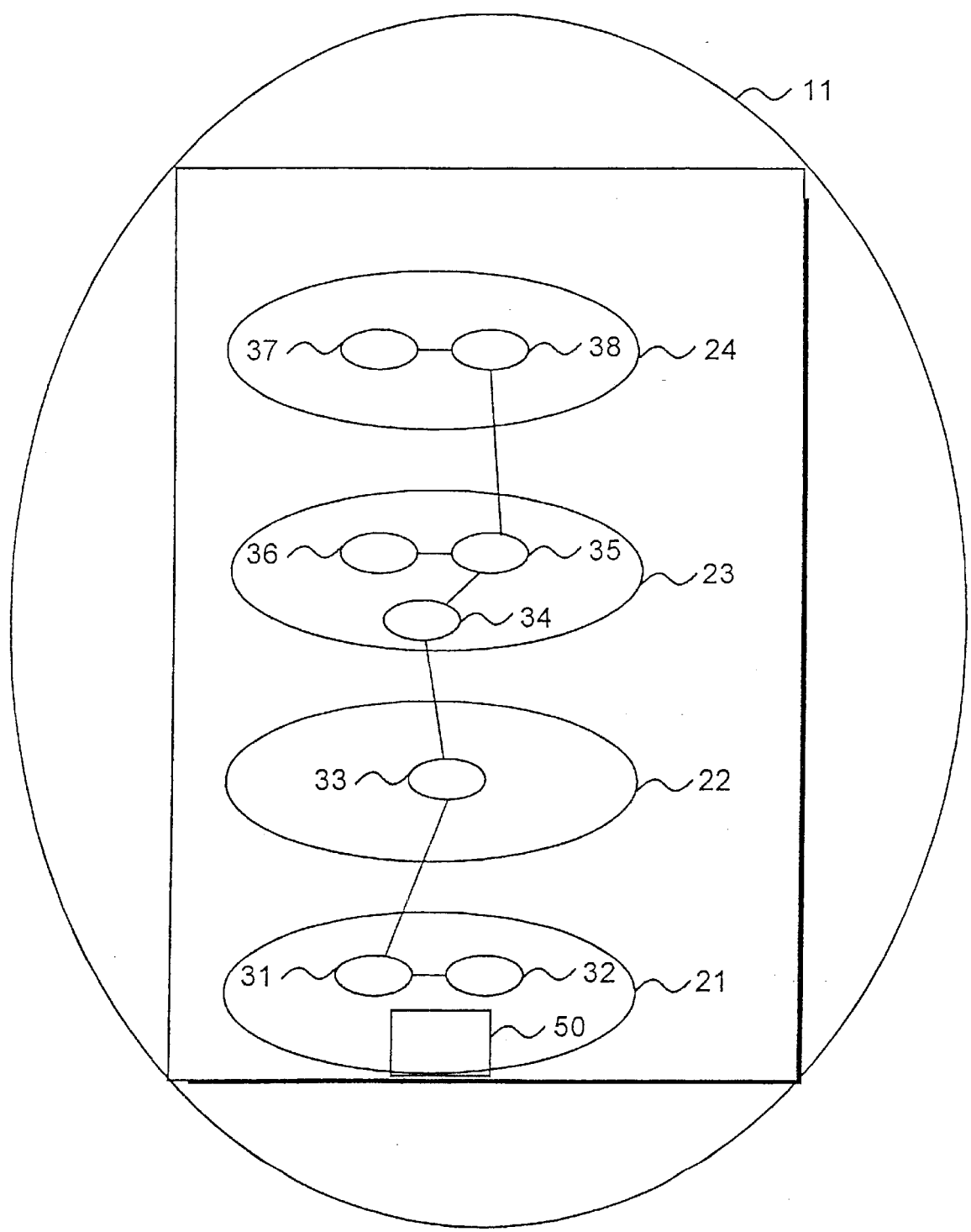
FIG. 1 shows a cellular radio system in accordance with the invention.

FIG. 1 shows a cellular radio system comprising cells of various sizes, the cells being located in an office building, for instance. The cellular radio system comprises cells 31 to 38, which are so-called Intranet Personal Cluster cells, provided on various floors of the office building. The Intranet Personal Cluster cells can be pico cells, for instance. The cellular radio system further comprises WIO gateway cells 21 to 24 provided on various floors of the office building. The gateway cell 21 is provided at the entrance 50 of the building. Outside the office building the cellular radio system comprises a micro and/or macro cell 11, whose radius exceeds the indoor cells 31 to 38. In the cellular radio system shown in the figure, the micro cell may also serve as a so-called umbrella cell. In general, the umbrella cell transmits a signal with high transmission power, whereby the umbrella cell may become dominating among the other cells of the cellular radio system.

Figure 2:
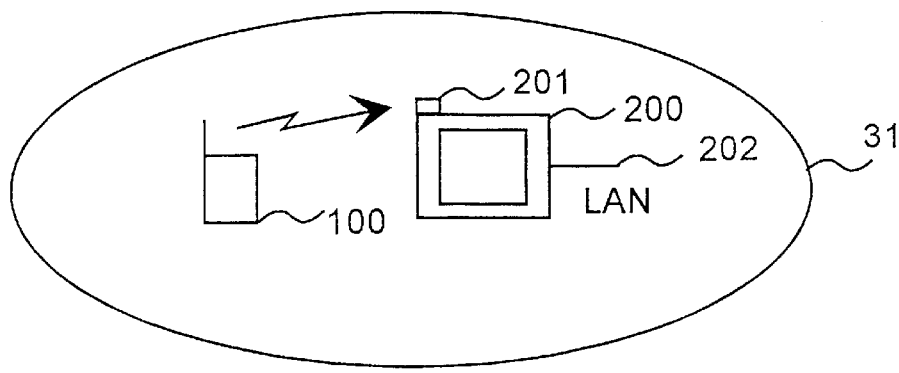
FIG. 2 shows a cell.

FIG. 2 illustrates the structure of the cell 31. Also the other cells 32 to 38 are in principle similar to the cell 31. The cell 31 comprises a computer system 200 acting as an Intranet Mobile Cluster in the cell area, the computer system being connected by means of a LAN network, for instance, to other cells 32 to 38 operating on the same principle. In its operating area the cell 31 further comprises a subscriber terminal 100. The computer 200 may comprise a transceiver 201, by means of which the computer and the subscriber terminal communicate. In practice, the subscriber terminal 100 and the computer 200 establish a connection by means of a transceiver operating within the frequency range of 2.46 GHz, for instance. Moreover, the connection between the subscriber terminal 100 and the computer 200 can be established by means of an infrared link. In the described Intranet Mobile Cluster, a conventional base station is not necessarily employed at all, even though it would be possible. The infrared connection operates within the frequency range of 2.46 GHz. Further, the connection between the subscriber terminal and the computer can be implemented by means of a cable, for instance. For the connection between the subscriber terminal and the computer to function in practice, the subscriber terminal 100 requires suitable SW and HW implementations, which convert the signalling between the subscriber terminal and the computer mutually compatible.

Figure 3:
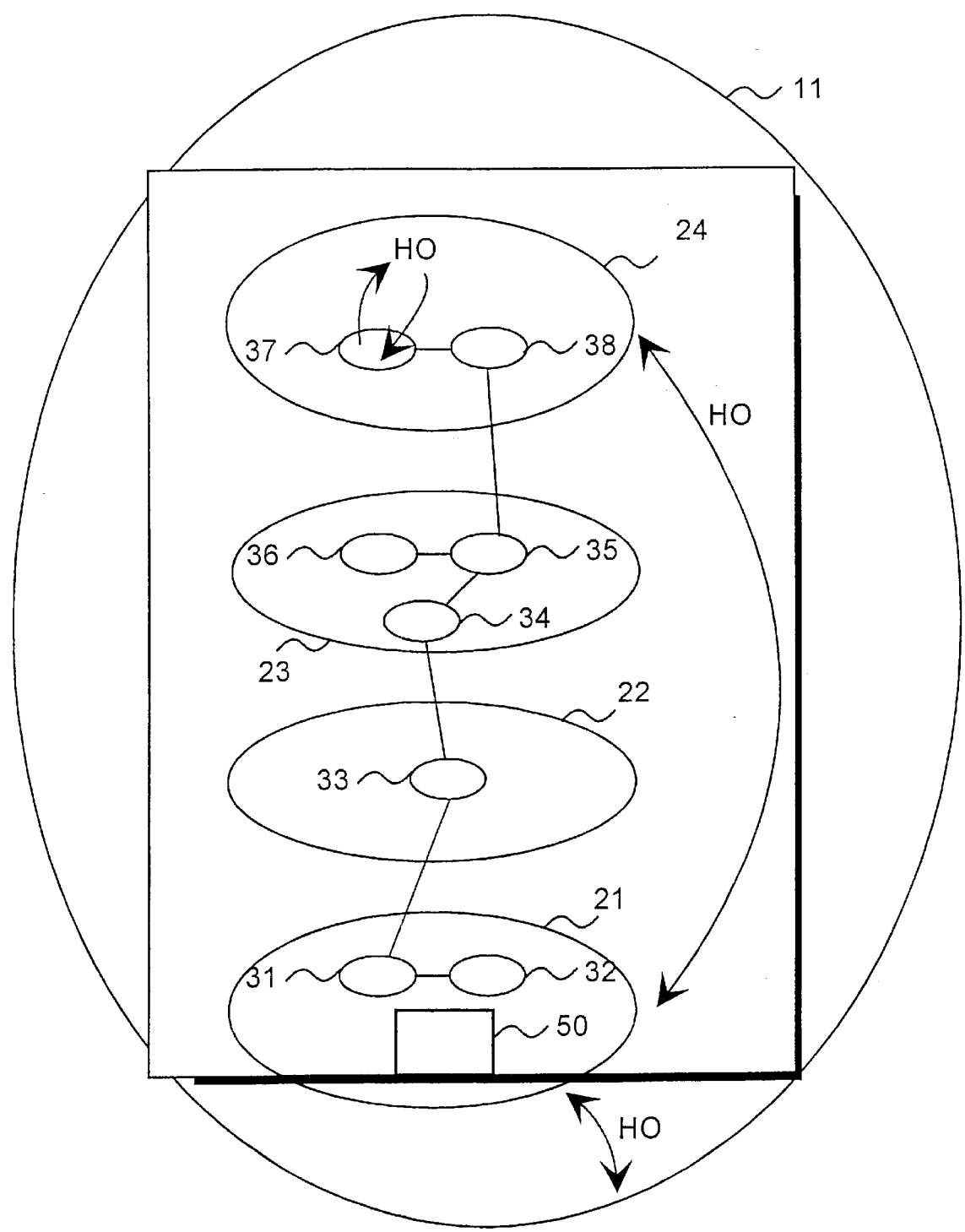
FIG. 3 illustrates handover situations in the cellular radio system.

FIG. 3 illustrates a cellular radio system which comprises one micro cell 11, four so-called gateway cells 21 to 24 and eight Personal Cluster cells 31 to 38. By means of the cells 21 to 24, 31 to 38 the interior of the building is divided into sectors, which enables prevention of potential interference between the micro cell 11 and the indoor network. The cellular radio system further comprises at least one subscriber terminal 100, which is located in the coverage area of a Personal Cluster cell, for instance. The cells 31 to 38 are located in the gateway cell operating areas in such a way that the gateway cell 21 comprises the cells 31 to 32 in its area, the gateway cell 22 comprises in its area the cell 33, the gateway cell 23 comprises the cells 34 to 36 in its area and the gateway cell 24 comprises the cells 37 to 38 in its area. The Personal Cluster cells 31 to 38 in the figure constitute a so-called Intranet Personal Cluster and the WIO gateway cells 21 to 24 constitute a so-called Intranet Mobile Cluster.

In the cellular radio system of FIG. 3, it is assumed that the cell 24 is located on the top floor of the building. The cell 23 is located one floor below the cell 24, and the cell 22 is located one floor below the cell 23. The cell 21 is located in the entrance 50 area on the ground floor of the office building. The operating areas of the cell 21 and the micro cell 11 may overlap. The borders of the operating areas of the cell 21 and the cell 11 may be located outside the office building in such a way, for instance, that when the operating area of the cell 21 ends the operating area of the micro cell 11 begins. At the entrance, part of the operating area of the cell 21 extends indoors.

The cell 21 is called a lobby cell, since the cell typically acts in the lobby area at the main entrance. However, the cell 21 does not necessarily act outside the office building at all. The lobby cell 21 can be made to extend coverage over a lift shaft of the building or an eventual staircase inside the building, whereby the channel handovers are not performed until on upper floors. In the above-described manner, the number of channel handovers can be reduced.

Let us assume that the subscriber terminal 100 established a connection by means of the computer 200 in the cell 37 area to a subscriber terminal in another cell area, for instance. However, it is not necessary that the subscriber terminal in the cell 37 area established the connection, but the subscriber terminal can also be assumed to be in idle mode. If the subscriber terminal 100 located in the operating area of the cell 37 moves outside the coverage area of the cell 37, the gateway cell 23 surrounding the cell 37 starts serving the subscriber terminal.

Configuration of the cells 21 to 24 in the cellular radio system can be based on GSM throughout the building, since the WIO system communicates with the computer, which enables continuous service to the subscriber terminals in the building. The Personal Cluster cell and the WIO Gateway cell surrounding it belong to the same area (Intranet Location Area) controlled by a WIO Gatekeeper device (WGK) 500, yet the area is different from the one that the outdoor micro cell 11 belongs to. In principle, the WGK operates in the same manner as the conventional base station controller. However, the operations of the WGK and the base station controller differ in that the WGK is able to switch calls.

The location of the gateway cells is of importance to the operation of the cellular radio system. The described cellular radio system in principle comprises two kinds of gateway cells. The gateway cells may serve as transmission links between the Intranet Personal Cluster and the Intranet Mobile Cluster. Moreover, the gateway cell may serve as a transmission link between the Intranet Mobile Cluster and the outdoor cell 11.

FIG. 3 also shows handover situations arisen between cells. In a handover situation the subscriber terminal changes the cell that serves the subscriber terminal for another. In the cellular radio system of the figure, it is possible for the subscriber terminal in the cell 37 area, for instance, to perform a handover to the cell 24. Likewise, it is possible for the subscriber terminal in the cell 24 area to perform a handover to the cell 37. It is also possible to perform the cell handover between the adjacent gateway cells. A handover to the outdoor cell 11 can only be performed from the cell 21 of the indoor gateway cells. However, it is possible to perform a handover from the outdoor cell 11 to all indoor gateway cells 21 to 24. In the cellular radio system, possible cell handovers are determined by means of neighbouring cell lists.

Figure 4:
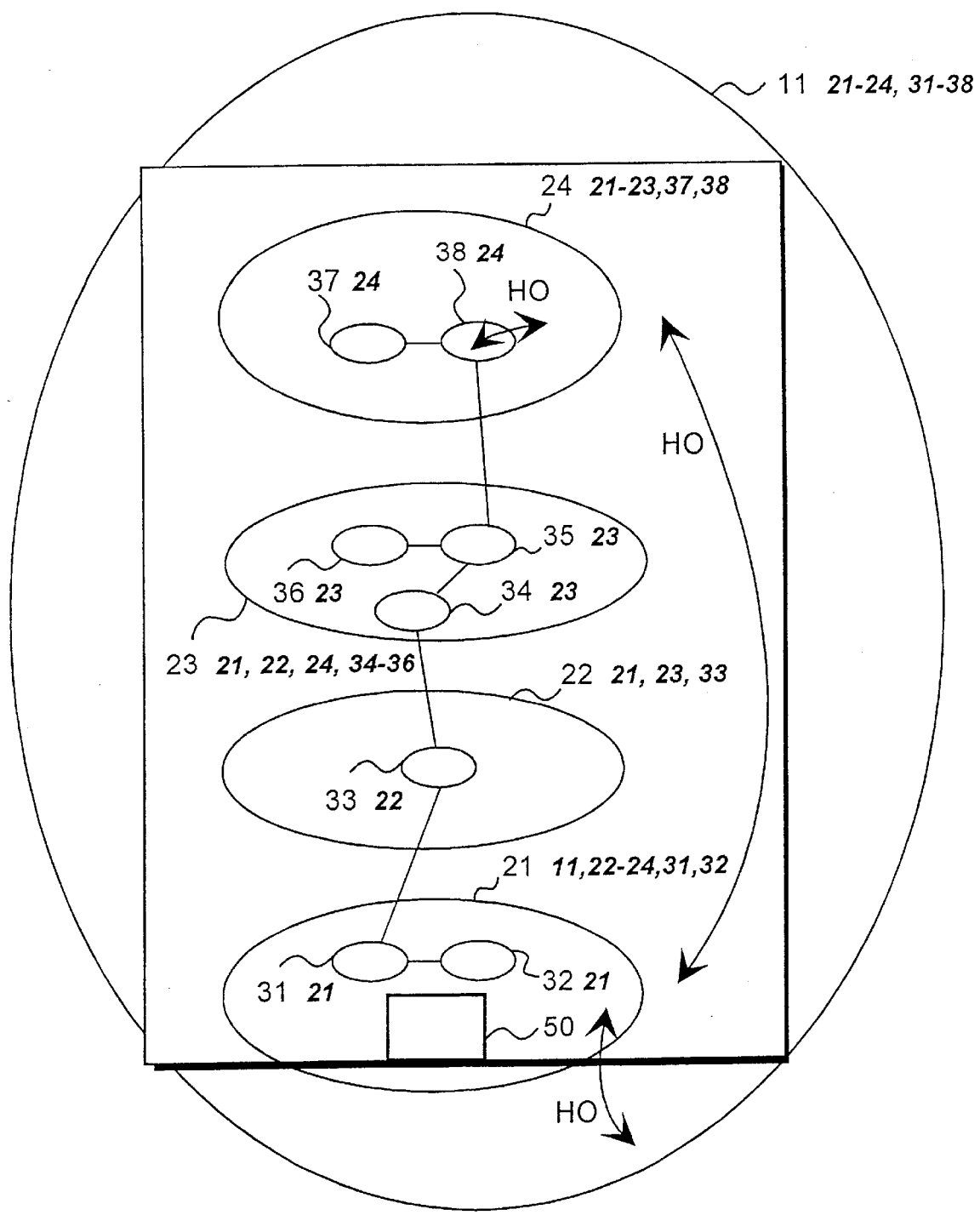
FIG. 4 illustrates neighbor cell listings of the cells.

Here below is presented Table 1, which clarifies the contents of the neighbor lists of the cells. Configuration of the cellular radio system, which corresponds to Table 1, is shown in FIG. 4. The table clearly shows that the neighbor list of the outdoor cell 11 includes all indoor gateway cells 21 to 24. Of the indoor cells, only the cell 21, which is preferably located in the lobby of the building, includes the outdoor cell 11 on its neighbor list.

| Cell | Cell type | Cells on cell neighbour list |
|---|---|---|
| 11 | outdoor cell | 21, 22, 23, 24, 31–38 |
| 21 | lobby gateway | 11 ,22, 23, 24, 31, 32 |
| 22 | WIO gateway | 21, 23, 33 |
| 23 | WIO gateway | 21, 22, 24, 34, 35, 36 |
| 24 | WIO gateway | 21, 22, 23, 37, 38 |
| 31 | Personal Cluster | 21 |
| 32 | Personal Cluster | 21 |
| 33 | Personal Cluster | 22 |
| 34 | Personal Cluster | 23 |
| 35 | Personal Cluster | 23 |
| 36 | Personal Cluster | 23 |
| 37 | Personal Cluster | 24 |
| 38 | Personal Cluster | 24 |

Since all indoor gateway cells 21 to 24 appear on the neighbor list of the outdoor cell 11, it is possible to return the subscriber terminal to the Personal Cluster cell level even in a case when the subscriber terminal is turned on at such a point in the building where the outdoor cell is dominating. If the cellular radio system employs SoLSA functionality (SOLSA=Support of Localized Service Area), it is possible to simplify the neighbor list of the outdoor cell 11 in such a way that the Personal Cluster cells 31 to 38 are deleted from the neighbor list. Deletion of the Personal Cluster cells from the neighbor list is possible, since the subscriber terminal has predetermined priorities to use SoLSA cells when the SoLSA functionality is applied. Thus the subscriber terminal can be forced to establish a connection to the transceiver 201, even though its signal would not be dominating.

Figure 5:
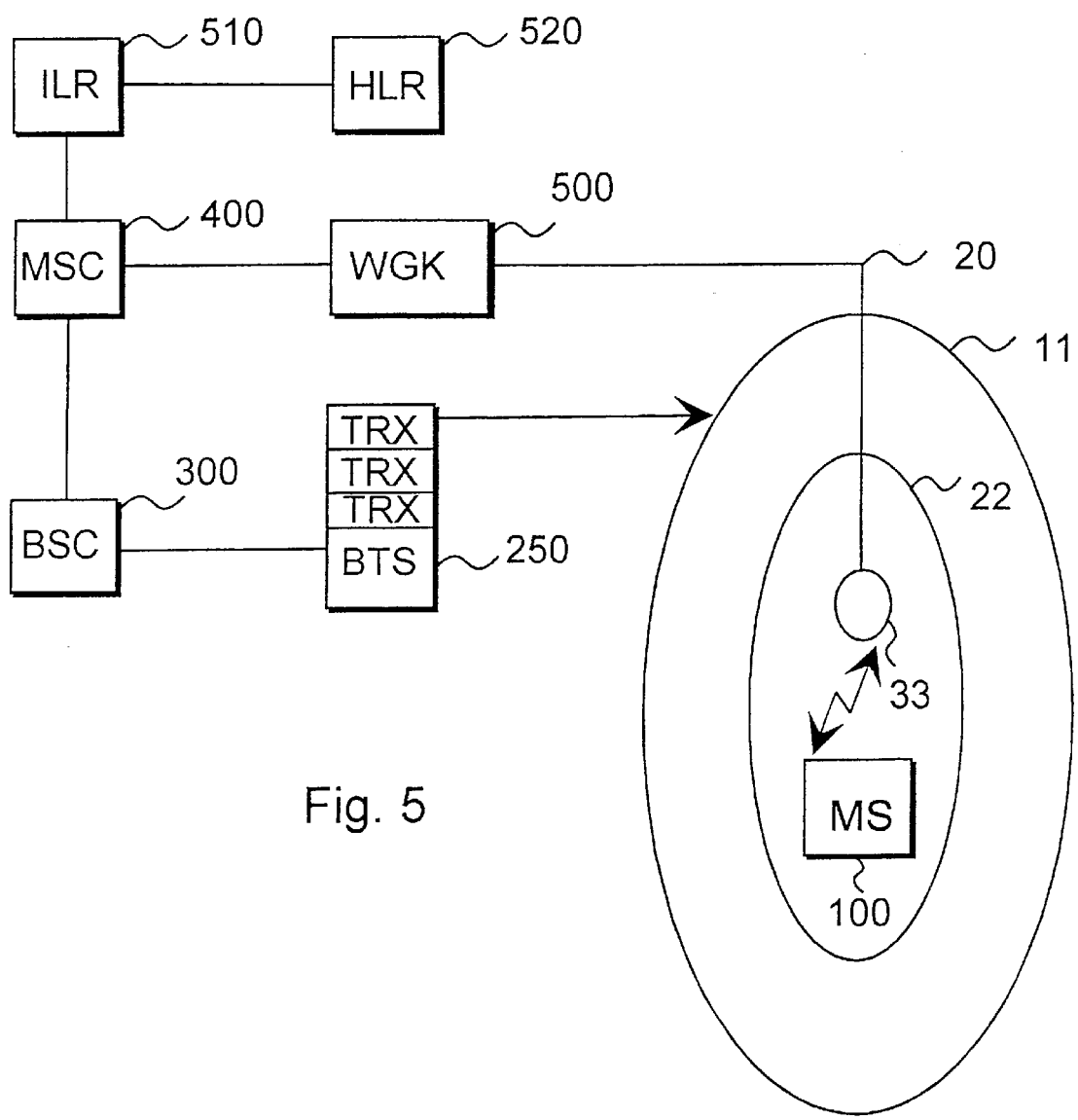
FIG. 5 illustrates an implementation of the cellular radio system in practice.

FIG. 5 illustrates one implementation alternative of the cellular radio system in accordance with the invention. The cellular radio system comprises a base station 250, a first base station controller 300, a mobile exchange 400 and a so-called WIO Gatekeeper device 500. The base station comprises TRX units, of which some constitute the outdoor cell 11. In this case, providing a gateway cell 22 is based on WIO function only. When the subscriber terminal 100 establishes a connection to a computer in the Personal Cluster cell 22, the connection signal is transmitted to the WIO Gatekeeper device 500 via a LAN network 20. Prior to transmitting the signal to the device 500, the signal is given an IP address, on the basis of which the signal is routed to the desired destination. In the ILR register, the subscriber terminal has the IP address of the cell to which the signal was transmitted.

The radio system of FIG. 5 also comprises an ILR register 510 (ILR=Intranet Location Register) and an HLR register 520 (HLR=Home Location Register). The HLR register comprises information on which location area the subscriber terminal is updated to. When the mobile telephone is brought in a building where the WIO system in accordance with the invention is employed, the mobile telephone connects to a specific Intranet Mobile Cluster. In the above situation, the IP address data of the mobile telephone SIM card are updated in the ILR register.

Even though the invention is described in the above with reference to the example in the accompanying drawings, it is obvious that the invention is not restricted thereto, but it can be modified in a variety of ways within the scope of the inventive idea disclosed in the attached claims.

What is claimed is:

1. A cell handover method employed in a cellular radio system, comprising at least one indoor subscriber terminal (100) and cells (31 to 38) with operating area of each being confined to the interior of a building, and at least one outdoor cell (11) whose operating area extends from the exterior to the interior of the building, and in which cellular radio system the cell serving the subscriber terminal (100) will be changed, characterized in that the radio system is configurated for cell handover in such a way that cells (31 to 38) are grouped into cell groups with a gateway cell (21 to 24) provided around each group, and with one gateway cell (21) provided at the entrance of the building, the gateway cell (21 to 24) surrounding the cell (31 to 38) is entered on the neighbor list of each cell (31 to 38), other gateway cells (22 to 24) and an outdoor cell (11) are entered on the neighbor list of the gateway cell (21) provided at the entrance, and the gateway cells (21 to 24) are entered on the neighbor list of the outdoor cell (11).

2. A method as claimed in claim 1, characterized in that, by means of the method, the subscriber terminal (100) is prevented from performing a cell handover from the cell (31 to 38) or other than the gateway cell provided at the entrance directly to the outdoor cell.

3. A method as claimed in claim 1, characterized in that if the subscriber terminal moves outside the operating area of the cell (31 to 38), the cell handover is performed from the cell (31 to 38) to the gateway cell (21 to 24) in whose operating area the subscriber terminal (100) is located.

4. A method as claimed in claim 1, characterized in that the cell handover is performed from the cell (31 to 38) to the gateway cell (21 to 24) surrounding it, if the subscriber terminal while in idle mode moves outside the operating area of the cell (31 to 38).

5. A method as claimed in claim 1, characterized in that the indoor subscriber terminal (100) establishes a connection to the outdoor cell (11) through the gateway cell (21) provided at the entrance of the building.

6. A method as claimed in claim 1, characterized in that the gateway cell (21 to 24) and the cells surrounded by said gateway cell are applied to the same location area in the cellular radio system, which a Gatekeeper device (500) of the cellular radio system has provided.

7. A method as claimed in claim 1, characterized by enabling the subscriber terminal (100), served by the outdoor cell, to perform a direct cell handover from the outdoor cell (11) to the indoor gateway cells (21 to 24).

8. A method as claimed in claim 1, characterized by enabling the subscriber terminal (100), served by the outdoor cell, to perform a direct cell handover from the outdoor cell (11) to the indoor cells (31 to 38).

9. A method as claimed in claim 1, characterized in that the gateway cell is formed in such a way that its coverage area extends, in addition to the lobby, to the lift shaft and staircase of the building.

10. A cellular radio system comprising at least one subscriber terminal (100) inside the building and cells (31 to 38) with operating area of each being confined to the interior of the building, and at least one outdoor cell (11) whose operating area extends from the exterior to the interior of the building, and in which cellular radio system the subscriber terminal (100) changes the serving cell if necessary, characterized in that the radio system is configured for cell handover in such a way that the cellular radio system comprises gateway cells (21 to 24), each surrounding a cell group consisting of cells (31 to 38), with one gateway cell (21) provided at the entrance of the building, each cell (31 to 38) comprises on the neighbor list the gateway cell surrounding the cell, the gateway cell (21) at the entrance comprises other gateway cells (22 to 24) and an outdoor cell (11) on its neighbor list, and the outdoor cell (11) comprises the gateway cells (21 to 24) on its neighbor list.

11. A cellular radio system as claimed in claim 10, characterized in that the outdoor cell (11) comprises the cells (31 to 38) on its neightbour list.

12. A cellular radio system as claimed in claim 10, characterized in that the neighbor cell lists of other gateway cells than the gateway cell (21) at the entrance comprise data, by means of which it is possible to prevent the subscriber terminal (100) from performing cell handover from the cell (31 to 38) or from other gateway cells than the gateway cell (21) at the entrance directly to the outdoor cell (11).

13. A cellular radio system as claimed in claim 10, characterized in that if the subscriber terminal (100) moves outside the operating area of the cell (31 to 38), the cell handover from the cell (31 to 38) is performed to the gateway cell (21 to 24) in whose operating area the subscriber terminal is located.

14. A cellular radio system as claimed in claim 10, characterized in that the subscriber terminal (100) performs the cell handover from the cell (31 to 38) to the gateway cell (21 to 24), in whose operating area said cell (31 to 38) is located, if the subscriber terminal while in idle mode moves outside the operating area of the cell (31 to 38).

15. A cellular radio system as claimed in claim 10, characterized in that the subscriber terminal (100) while inside the building establishes a connection to the outdoor cell (11) through the gateway cell (21) at the entrance of the building.

16. A cellular radio system as claimed in claim 10, characterized by applying the gateway cell (21 to 24) and the cells (31 to 38) surrounded by said gateway cell to the same location area of a base station (250) in the cellular radio system.

17. A cellular radio system as claimed in claim 10, characterized in that the subscriber terminal (100), served by the outdoor cell (11), performs a cell handover from the outdoor cell directly to the indoor gateway cells (21 to 24).

18. A cellular radio system as claimed in claim 10, characterized in that the subscriber terminal (100), served by the outdoor cell (11), performs a cell handover from the outdoor cell (11) directly to the indoor cells (31 to 38).

19. A cellular radio system as claimed in claim 10, characterized in that the gateway cell (21) covers the lift shaft and the staircase inside the building, in addition to the lobby.

\* \* \* \* \*